Dec. 15, 1942.    L. E. SCHLABAUGH ET AL    2,305,196
BEER KEG VALVE
Filed July 24, 1940
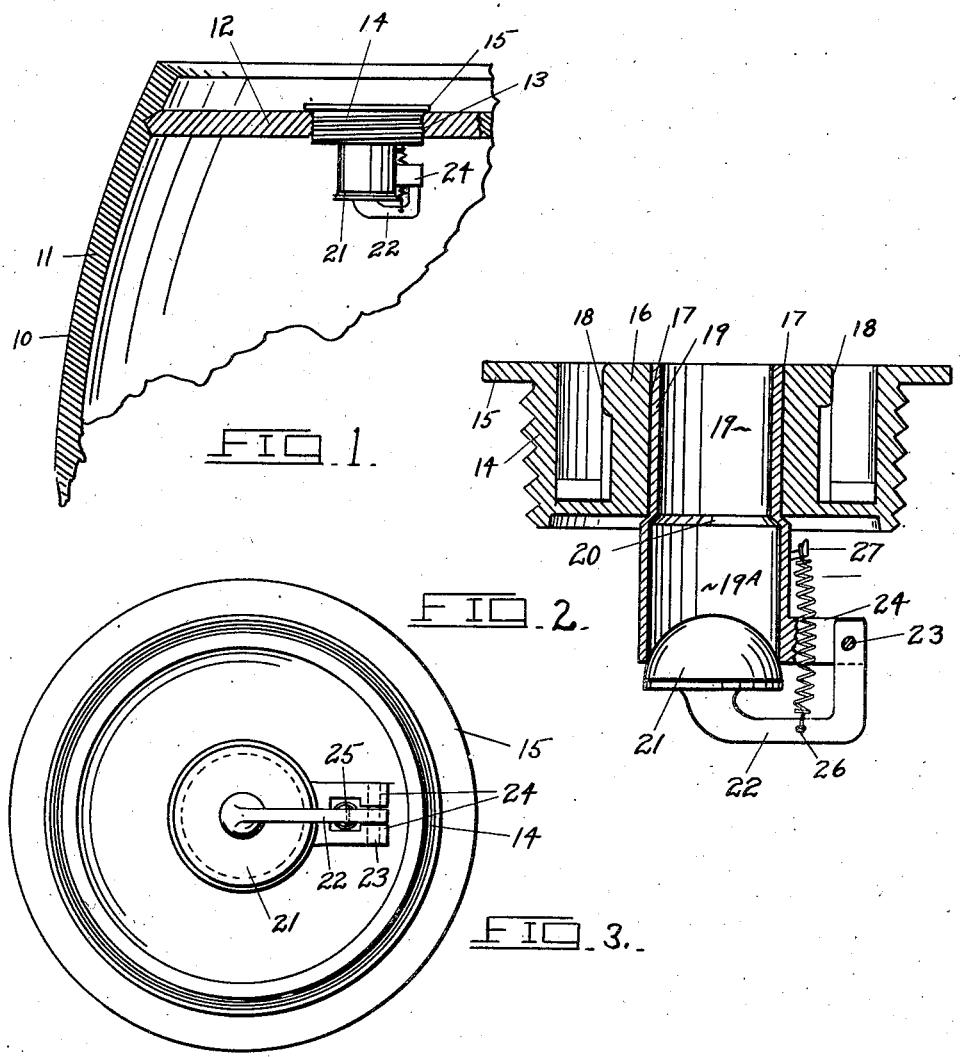
LEWIS E. SCHLABAUGH
& SAMUEL M. JONES,
Inventors:
W. B. Harpman
Attorney Patented Dec. 15, 1942

2,305,196

UNITED STATES PATENT OFFICE 2,305,196

BEER KEG VALVE

Lewis E. Schlabaugh and Samuel M. Jones, North Jackson, Ohio

Application July 24, 1940, Serial No. 347,180

2 Claims. (Cl. 217—100)

This invention relates to a valve for a beer keg.

The principal object of this invention is the provision of an improved valve adapted to be installed in the bush of a beer keg so that the opening therethrough will be closed by the valve at all times except when a draft rod or similar object is inserted therethrough.

A further object of the invention is the provision of an improved valve for a beer keg for the purpose indicated and which may be used in filling the keg at the brewery as well as for the purpose of withdrawing the beverage therethrough.

A further object of the invention is the provision of an improved valve for a beer keg or similar beverage container which may be inserted in existing equipment.

A still further object of the invention is the provision of a beer keg valve which, by normally maintaining closed position, serves to prevent the introduction of foreign objects into the keg especially at such times as the keg is empty and the opening in the bush of the valve would otherwise be normally open and thus permit the introduction of objectionable foreign materials into the keg such as insects, dirt, water, grease, etc., all of which make necessary the thorough cleaning of the keg upon its return to the brewery and some of which make necessary the repitching of the keg before it can again be used.

A further object of the invention is the provision of a beer keg valve which is not effected by subsequent coatings of pitch it may normally be expected to receive when in position in the bush of a beer keg.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed without departing from the spirit of the invention.

The invention is illustrated in the accompanying drawing, wherein:

Figure 1 is a cross sectional elevation of a portion of a beer keg or other similar beverage container showing the conventional bush therein.

Figure 2 is a cross sectional side elevation of a conventional bush showing the beer keg valve inserted therein.

Figure 3 is a bottom view of the beer keg valve which shows in detail the movable parts thereof.

By referring to the drawing and Figure 1 in particular, it will be seen that the numeral 10 indicates a keg of the usual construction adapted to contain a beverage such as beer, and consisting of a plurality of staves 11 secured together in the usual manner and having a head 12 secured within the outer ends of the staves 11. The keg 10 is provided with the usual bottom of identical construction with the head 12 but is not shown in Figure 1.

Still referring to Figure 1 it will be observed that the head 12 is provided with an opening 13 extending therethrough of conventional diameter which is adapted to receive a screw threaded bush 14 which is usually positioned in the opening 13 in the head 12 at the time of the keg's construction. The bush 14 is provided with a laterally extending flange 15 which engages the outer surface of the head 12 and limits the inward positioning of the bush and at the same time serves to assist in producing a tight connection.

By referring to Figure 2 of the drawing, wherein an enlarged view of the bush 14 is shown, it will be observed that the bush 14 has a cylindrical hollow extension 16 formed integrally therewith which provides a centrally positioned opening 17 through which a keg is normally filled or the contents thereof withdrawn. In order that various tap attachments may be fitted to this bush 14 and particularly to the cylindrical hollow extension 16 formed therein, it will be seen that the uppermost portion of the extension 16 is provided with a laterally extending flange 18 which permits the tap attachments to be suitably connected thereto.

The present invention concerns the placement of a beer keg valve within the opening 17 of the bush 14 and, as may be seen by referring to Figures 1 and 2 of the drawing, the valve comprises a tubular body 19 which is preferably press fit within the opening 17 in the bush 14. The lowermost portion of the tubular body being indicated by the numeral 19A is slightly enlarged in comparison with the uppermost portion thereof, as shown in Figure 2, so that an annular shoulder 20 divides the two sections.

Still referring to Figure 2 it will be seen that the lowermost end of the tubular body 19A is adapted to be closed by a suitable closure member comprising a semi-ball shaped valve 21 supported by an arm 22 which is itself L shaped and pivoted at one end thereof by means of a pivot 23 between a pair of outwardly extending secondary arms 24 (see Figure 3). In order that the semi-ball shaped valve 21 may be normally held in closed position as shown in the drawing, a coil spring 25 is positioned between an opening 26 in the support arm 22 and a hook 27 formed on the side of the enlarged tubular body so that it normally tends to hold the semi-ball shaped valve in closed position partially within the opening in the lower end of the tubular body portion 19A.

By referring now to Figure 1 of the drawing it will be observed that a draft rod may be inserted into the keg 10 through the opening in the bush 14 and that the same will easily displace the semi-ball shaped valve 21 due primarily to the round shape thereof and, further, that upon removal of the draft rod from the keg 10 to the spring 25 will immediately cause the semi-ball shaped valve 21 to again close the opening thus preventing the entrance of foreign materials into the keg.

By referring again to Figure 2 it will be observed that the enlarged lower portion 19A of the tubular body of the valve and its associated annular collar 20 provides an excellent fit for the cork commonly used in sealing the beer kegs after being filled at the brewery in that a cork may be driven downwardly into this enlarged area so that it will seat against the annular shoulder 20 and thus more effectively resist the upward forces of expanding gases normally present in the beer. The cork commonly used for sealing the kegs is driven on into the keg by the draft rod when the keg is tapped for withdrawal of the contents.

In as much as the beer keg valve herein shown and described is intended primarily to be installed in existing equipment, it has been designed so that it can be inserted through the bung-hole of the keg which is located in the side of the keg with respect to the bush which is located in the head or top of the keg, and pressed upwardly into the opening 17 in the bush after the same has been reamed and tapped and the beer keg valve threadably inserted in the tapped opening. It will thus be seen that the beer keg valve shown and described herein may be conveniently and practically inserted in the bush of beer kegs now in use without changing, removing, or replacing any of the parts thereof and that the valve may be inserted in bushes welded into steel kegs equally as well as into those bushes threaded into wooden heads of kegs as illustrated.

It will also be observed that if desirable the complete bush might be formed for new equipment with the valve formed as an integral part thereof if desired.

Having thus described our invention what we claim is:

1. A valve for beer keg adapted to be press-fit into a tap or bung bush thereof from the inner side of the keg, and comprising a tubular body member one portion of which is of approximately the same diameter as the bung bush and another portion of which is of a greater diameter, the larger portion of the tubular body member adapted to limit the insertion of the tubular body member into the bung bush, a movable semi ball shaped valve member mounted on the said enlarged body portion and adapted to close the said opening, the said movable ball shaped valve member pivoted between a pair of arms formed on the said enlarged body portion, spring means operatively connected to the said movable valve member for maintaining the same in normally closed position.

2. A valve for beer keg adapted to be press-fit into a tap or bung bush thereof from the inner side of the keg, and comprising a tubular body member one portion of which is of approximately the same diameter as the bung bush and another portion of which is of a greater diameter, the larger portion of the tubular body member adapted to limit the insertion of the tubular body member into the bung bush, a movable semi ball shaped valve member mounted on a supporting arm and pivoted between projections on the said enlarged body portion and adapted to close the said opening, spring means operatively connected between a hook formed on the said enlarged body portion and the said supporting arm to maintain the said semi ball shaped valve in normally closed position.

LEWIS E. SCHLABAUGH.
SAMUEL M. JONES.